(12) United States Patent
Akiyama

(10) Patent No.: US 10,649,321 B2
(45) Date of Patent: May 12, 2020

(54) LIGHT SOURCE DEVICE AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/445,275

(22) Filed: Jun. 19, 2019

(65) Prior Publication Data
US 2019/0391476 A1 Dec. 26, 2019

(30) Foreign Application Priority Data
Jun. 20, 2018 (JP) .................. 2018-116909

(51) Int. Cl.
*G03B 21/20* (2006.01)
*H04N 9/31* (2006.01)

(52) U.S. Cl.
CPC ..... *G03B 21/2033* (2013.01); *G03B 21/2073* (2013.01); *H04N 9/3158* (2013.01); *H04N 9/3161* (2013.01)

(58) Field of Classification Search
CPC ............ G03B 21/2033; G03B 21/2073; H04N 9/3158; H04N 9/3161
USPC ........................................................ 353/20
See application file for complete search history.

(56) References Cited

U.S. PATENT DOCUMENTS

2016/0353069 A1 12/2016 Chikahisa
2019/0086779 A1* 3/2019 Chang .................. G02B 27/108

FOREIGN PATENT DOCUMENTS

JP         2016-224304 A    12/2016

* cited by examiner

*Primary Examiner* — Jerry L Brooks
(74) *Attorney, Agent, or Firm* — Oliff PLC

(57) ABSTRACT

A light source device is provided with a blue laser emitting element, a red laser emitting element, a light combining element, a diffusely reflecting element, a phosphor, a polarization splitting/combining element having a polarization split function, and a first wave plate. The polarization splitting/combining element guides a blue first polarization component obtained by performing polarization split on the light from the blue laser emitting element, and the light from the red laser emitting element to the diffusely reflecting element, and guides a blue second polarization component obtained by performing polarization split on the light from the blue laser emitting element to the phosphor. Then, the polarization splitting/combining element emits red diffused light, blue diffused light, a red polarization split component, and a principal fluorescence component obtained by removing the first red fluorescence component from fluorescence in one direction to thereby generate illumination light.

8 Claims, 3 Drawing Sheets

LIGHT SOURCE DEVICE AND PROJECTOR

The present application is based on, and claims priority from JP Application Serial Number 2018-116909, filed Jun. 20, 2018, the disclosure of which is hereby incorporated by reference herein in its entirety.

BACKGROUND

1. Technical Field

The present disclosure relates to a light source device and a projector.

2. Related Art

In recent years, there is a technology of generating illumination light by combining a blue laser beam and fluorescence generated by excitation with the blue laser beam with each other as a light source device used for a projector. For example, in JP-A-2016-224304, there is disclosed a light source device which generates the illumination light by combining yellow fluorescence and a blue laser beam with each other, and assists a red component insufficient in the illumination light with a red laser beam.

In the light source device described above, the fluorescence is transmitted through a combining mirror and the red laser beam is reflected by the combining mirror, and thus the two light beams are emitted in the same direction to thereby generate the illumination light.

Here, in the case of, for example, increasing the transmittance of the combining mirror for the red component included in the fluorescence, the red laser beam transmitted through the combining mirror increases, and thus, the light loss caused in the red laser beam increases. In contrast, in the case of, for example, increasing the reflectance of the combining mirror for the red laser beam, an amount of the red component included in the fluorescence and reflected by the combining mirror increases, and thus, the light loss caused in the fluorescence increases. In the light source device described above, since the loss always occurs in either of the red component of the fluorescence and the red laser beam as described above, it is unachievable to efficiently assist the red light. Further, in the light source device described above, since a plurality of diffusion plates is used, there is also a problem that the cost increases.

SUMMARY

A light source device according to an aspect of the present disclosure includes a blue laser emitting element, a red laser emitting element configured to emit light in a predetermined wavelength band, a light combining element configured to combine light from the blue laser emitting element and the light from the red laser emitting element with each other, a diffusely reflecting element configured to diffuse and reflect a part of the light from the blue laser emitting element and the light from the red laser emitting element, a phosphor excited by a part of the light from the blue laser emitting element to emit fluorescence including red fluorescence and green fluorescence, a polarization splitting/combining element disposed in a posterior stage of the light combining element, and having a polarization split function with respect to a first red fluorescence component corresponding to the predetermined wavelength band out of the red fluorescence, the light from the red laser emitting element, and the light from the blue laser emitting element, and a first wave plate disposed between the polarization splitting/combining element and the diffusely reflecting element, wherein the polarization splitting/combining element guides a blue first polarization component obtained by performing polarization split on the light from the blue laser emitting element, and the light from the red laser emitting element to the diffusely reflecting element, and guides a blue second polarization component obtained by performing polarization split on the light from the blue laser emitting element to the phosphor, emits, in one direction, red diffused light obtained by converting the light from the red laser emitting element via the diffusely reflecting element and the first wave plate into a different polarization state, and blue diffused light obtained by converting the blue first polarization component via the diffusely reflecting element and the first wave plate into a different polarization state, a red polarization split component obtained by performing polarization split on the first red fluorescence component, and a principal fluorescence component obtained by removing the first red fluorescence component from the fluorescence, to combine the red diffused light, the blue diffused light, the red polarization split component, and the principal fluorescence component with each other to generate illumination light.

The light source device according to the above aspect may further include a second wave plate rotatably disposed between the blue laser emitting element and the light combining element, and the light emitted from the blue laser emitting element may enter the light combining element via the second wave plate.

In the light source device according to the above aspect, the light in the predetermined wavelength band emitted by the red laser emitting element may be the same in polarization direction as the blue first polarization component.

A projector according to another aspect of the present disclosure includes the light source device according to the above aspect, a light modulation device configured to modulate light from the light source device in accordance with image information to form image light, and a projection optical system configured to project the image light.

DESCRIPTION OF AN EXEMPLARY EMBODIMENT

Hereinafter, an embodiment of the present disclosure will be described with reference to the drawings.

Figure 1:
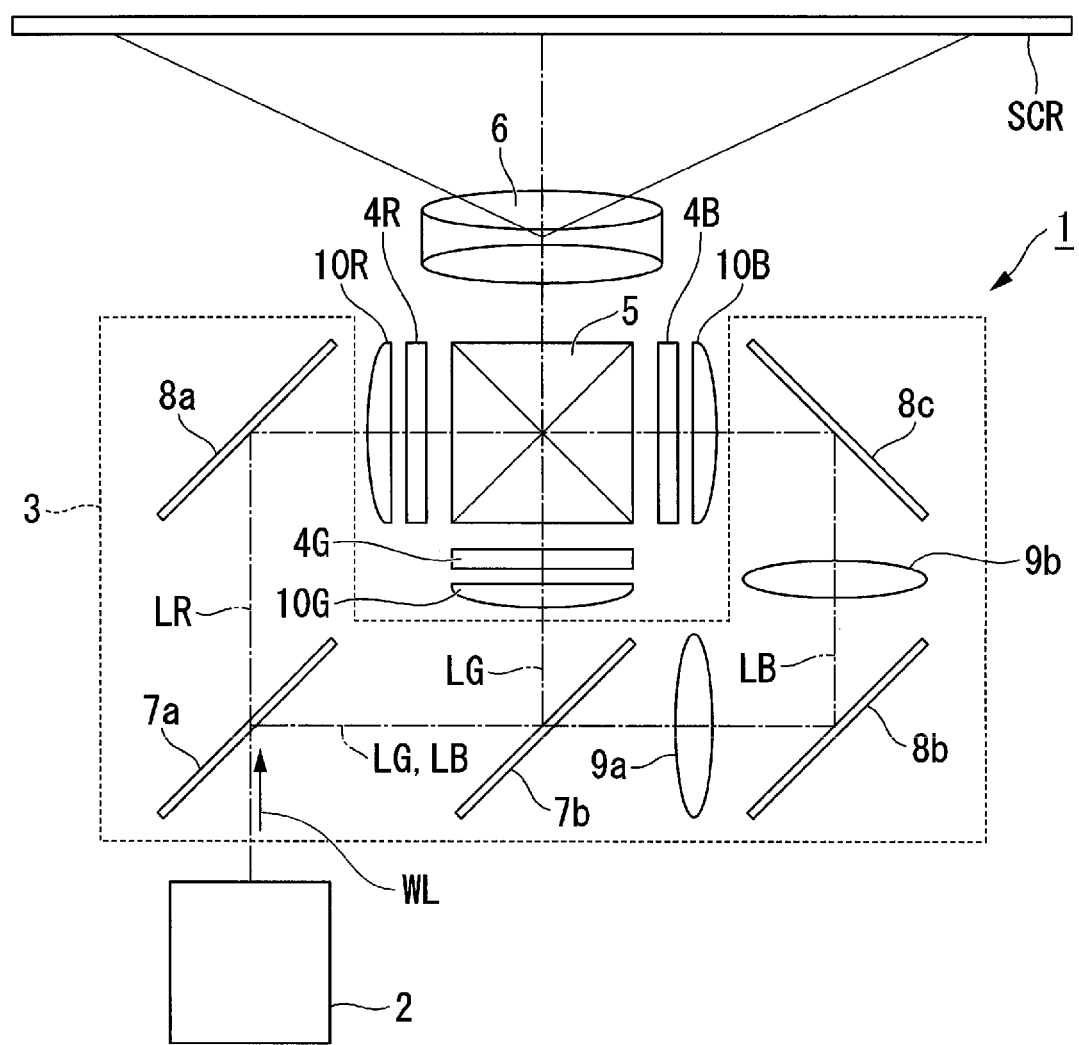
FIG. 1 is a schematic configuration diagram of a projector according to an embodiment.

FIG. 1 is a schematic configuration diagram of a projector according to the present embodiment.

As shown in FIG. 1, the projector 1 according to the present embodiment is a projection-type image display device for displaying a color image on a screen SCR. The projector 1 is provided with a light source device 2, a color separation optical system 3, a light modulation device 4R, a light modulation device 4G, a light modulation device 4B, a combining optical system 5, and a projection optical system 6.

The light source device 2 according to the present embodiment emits white illumination light WL toward the color separation optical system 3. The color separation optical system 3 separates the illumination light WL from the light source device 2 into red light LR (e.g., light in a wavelength band of 600 nm through 700 nm), green light LG (e.g., light in a wavelength band of 500 nm through 600 nm), and blue light LB (e.g., light in a wavelength band of 440 nm through 470 nm).

The color separation optical system 3 is generally provided with a first dichroic mirror 7a and a second dichroic mirror 7b, a first total reflection mirror 8a, a second total reflection mirror 8b and a third total reflection mirror 8c, and a first relay lens 9a and a second relay lens 9b.

The first dichroic mirror 7a separates the illumination light WL from the light source device 2 into the red light LR and the other light (the green light LG and the blue light LB). The first dichroic mirror 7a transmits the red light LR thus separated from, and at the same time reflects the rest of the light (the green light LG and the blue light LB). Meanwhile, the second dichroic mirror 7b reflects the green light LG and at the same time transmits the blue light LB to thereby separate the rest of the light into the green light LG and the blue light LB.

The first total reflection mirror 8a is disposed in the light path of the red light LR, and reflects the red light LR, which has been transmitted through the first dichroic mirror 7a, toward the light modulation device 4R. Meanwhile, the second total reflection mirror 8b and the third total reflection mirror 8c are disposed in the light path of the blue light LB to guide the blue light LB, which has been transmitted through the second dichroic mirror 7b, to the light modulation device 4B. The green light LG is reflected by the second dichroic mirror 7b toward the light modulation device 4G.

The first relay lens 9a is disposed between the second dichroic mirror 7b and the second total reflection mirror 8b in the light path of the blue light LB. The second relay lens 9b is disposed between the second total reflection mirror 8b and the third total reflection mirror 8c in the light path of the blue light LB.

The light modulation device 4R modulates the red light LR in accordance with image information to form image light corresponding to the red light LR. The light modulation device 4G modulates the green light LG in accordance with the image information to form image light corresponding to the green light LG. The light modulation device 4B modulates the blue light LB in accordance with the image information to form image light corresponding to the blue light LB.

As the light modulation device 4R, the light modulation device 4G, and the light modulation device 4B, there are used, for example, transmissive liquid crystal panels. Further, on the incident side and the exit side of each of the liquid crystal panels, there are respectively disposed polarization plates (not shown). Hereinafter, the light modulation device 4R, the light modulation device 4G and the light modulation device 4B are simply referred to as the light modulation devices 4R, 4G and 4B.

Further, on the incident side of the light modulation devices 4R, 4G and 4B, there are respectively disposed a field lens 10R, a field lens 10G and a field lens 10B. The field lens 10R, the field lens 10G and the field lens 10B respectively make the red light LR, the green light LG and the blue light LB entering the respective light modulation devices 4R, 4G and 4B telecentric.

The image light from each of the light modulation devices 4R, 4G and 4B enters the combining optical system 5. The combining optical system 5 combines the image light corresponding to the red light LR, the image light corresponding to the green light LG, and the image light corresponding to the blue light LB with each other, and then emits the image light thus combined toward the projection optical system 6. As the combining optical system 5, there is used, for example, a cross dichroic prism.

The projection optical system 6 is constituted by a projection lens group, and projects the image light combined by the combining optical system 5 toward the screen SCR in an enlarged manner. Thus, the color image enlarged is displayed on the screen SCR.

Light Source Device

Figure 2:
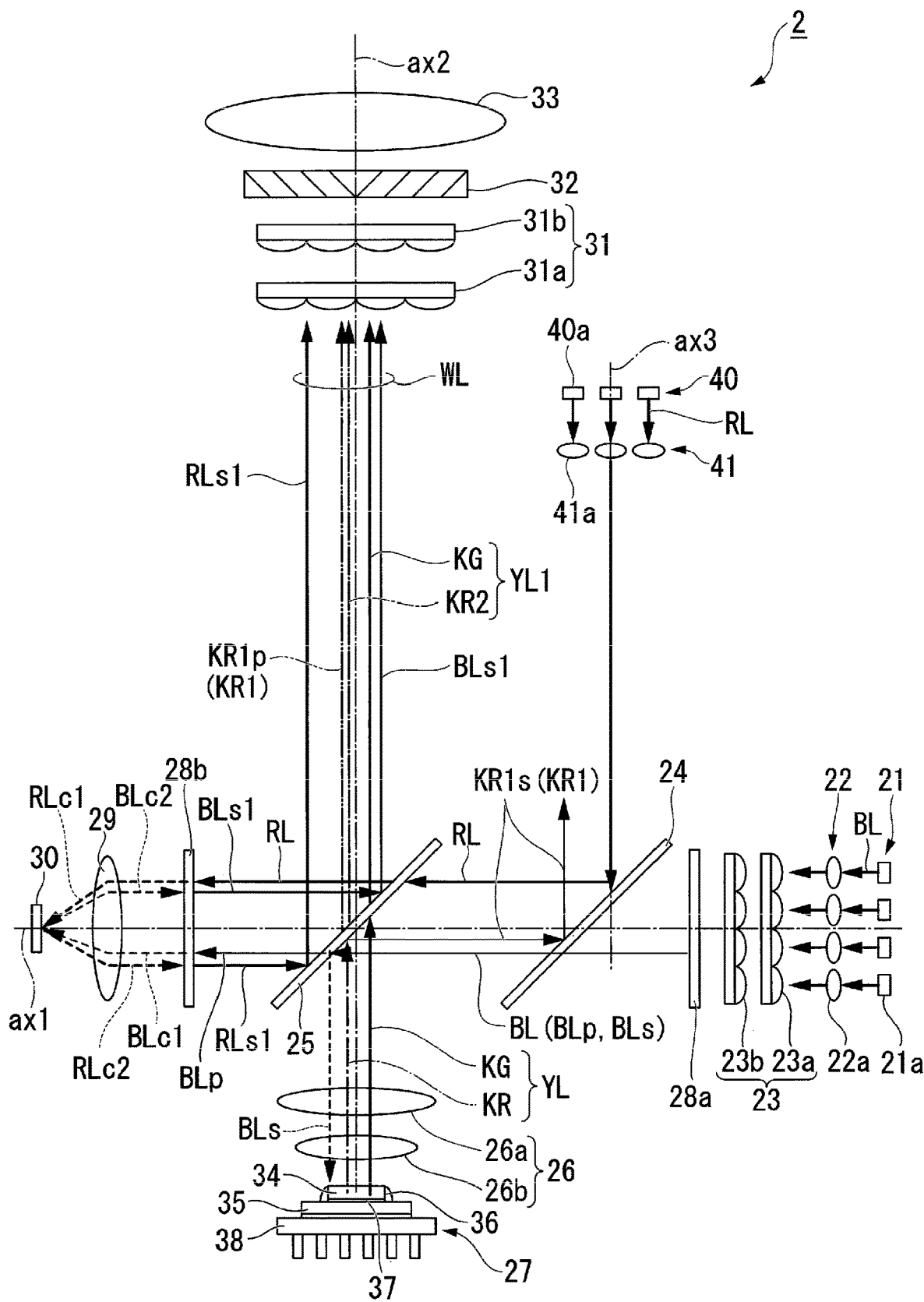
FIG. 2 is a diagram showing a schematic configuration of a light source device.

Then, the light source device 2 will be described. FIG. 2 is a diagram showing a schematic configuration of the light source device. As shown in FIG. 2, the light source device 2 is provided with a blue array light source 21, a first collimator optical system 22, a homogenizer optical system 23, a second wave plate 28a, a dichroic mirror (light combining element) 24, a polarization beam splitter (a polarization splitting/combining element) 25, a first light collection optical system. 26, a fluorescence emitting element 27, a first wave plate 28b, a second light collection optical system 29, a diffusely reflecting element 30, a red supplementary light source 40, a second collimator optical system 41, a lens integrator 31, a polarization conversion element 32, and a superimposing lens 33.

The blue array light source 21, the first collimator optical system 22, the homogenizer optical system 23, the second wave plate 28a, the dichroic mirror 24, the polarization beam splitter 25, the first wave plate 28b, the second light collection optical system 29 and the diffusely reflecting element 30 are arranged in series on a light axis ax1 of the blue array light source 21.

Further, the fluorescence emitting element 27, the first light collection optical system 26, the polarization beam splitter 25, the lens integrator 31, the polarization conversion element 32 and the superimposing lens 33 are arranged in series on an illumination light axis ax2. The light axis ax1 and the illumination light axis ax2 are located in the same plane, and are perpendicular to each other.

Further, the red supplementary light source 40, the second collimator optical system 41, and the dichroic mirror 24 are disposed in series on a light axis ax3 of the red supplementary light source 40.

The blue array light source 21 is provided with a plurality of blue laser emitting elements 21a. The plurality of blue laser emitting elements 21a is arranged in an array in a plane perpendicular to the light axis ax1. The blue laser emitting elements 21a each emit, for example, a blue light beam BL (e.g., a blue laser beam in a wavelength band of 440 nm through 470 nm).

The light beams BL emitted from the blue array light source 21 enter the first collimator optical system 22. The first collimator optical system 22 converts the light beams BL emitted from the blue array light source 21 into parallel light. The collimator optical system 22 is constituted by, for example, a plurality of collimator lenses 22a arranged in an array. The collimator lenses 22a are disposed so as to correspond respectively to the blue laser emitting elements 21a.

The light beams BL having passed through the first collimator optical system 22 enter the homogenizer optical system 23. The homogenizer optical system 23 includes multi-lenses 23a, 23b. The homogenizer optical system 23 homogenizes the illuminance distribution in an area to be illuminated (a phosphor 34) in cooperation with the first light collection optical system 26. Further, the homogenizer optical system 23 homogenizes the illuminance distribution in an area to be illuminated (the diffusely reflecting element 30) in cooperation with the second light collection optical system 29.

The light beams BL having been transmitted through the homogenizer optical system 23 enter the second wave plate 28a. The second wave plate 28a is, for example, a half-wave plate disposed rotatably. The light beams BL emitted from the blue laser emitting elements 21a are each linearly polarized light. By appropriately setting the rotational angle of the second wave plate 28a, light beams including S-polarized light and P-polarized light with respect to the polarization splitter 25 described later at a predetermined ratio can be obtained as the light beams BL transmitted through the second wave plate 28a. By rotating the second wave plate 28a, the ratio between the S-polarized light and the P-polarized light can be changed.

The light beams BL, which are generated by passing through the second wave plate 28a, and include the S-polarized light and the P-polarized light, enter the dichroic mirror 24. The dichroic mirror 24 transmits the light beams BL irrespective of the polarization state, and at the same time reflects the red light (the red supplementary light beam RL emitted from the red supplementary light source 40 described later) different in wavelength band from the light beams BL having the blue color, and then combines the light beams BL and the red light with each other and emits the result in the same direction. The light beams BL having been transmitted through the dichroic mirror 24 enter the polarization beam splitter 25. The polarization beam splitter 25 is disposed so as to form an angle of 45° with the light axis ax1.

Incidentally, the light source device 2 according to the present embodiment is arranged to supplement the red component (the red light LR) of the illumination light WL with the light emitted from the red supplementary light source 40. The red supplementary light source 40 has a plurality of red laser emitting elements 40a. It should be noted that the number of the red laser emitting elements 40a is not particularly limited.

In the present embodiment, the red laser emitting elements 40a each emit a red supplementary light beam (the red laser beam) RL as the light in the predetermined wavelength band. Specifically, the red supplementary light beam RL is a laser beam having a peak wavelength in a range of, for example, 635 nm through 645 nm. Further, the red supplementary light beam RL is linearly polarized light, and corresponds to the P-polarized light with respect to the polarization beam splitter 25 described later. In other words, the red laser emitting elements 40a each emit the light having the same polarization direction as the P-polarized light beam BLp obtained by performing the polarization split on the light beam BL using the polarization beam splitter 25 as the red supplementary light beam RL.

The red supplementary light beams RL emitted from the respective red laser emitting elements 40a enter the second collimator optical system 41. The second collimator optical system 41 converts the red supplementary light beams RL emitted from the respective red laser emitting elements 40a into parallel light. The second collimator optical system 41 is constituted by, for example, a plurality of collimator lenses 41a arranged in an array. The collimator lenses 41a are disposed so as to correspond respectively to the red laser emitting elements 40a.

The red supplementary light beams RL having passed through the second collimator optical system 41 are reflected by the dichroic mirror 24, and are then combined with the light beams BL transmitted through the dichroic mirror 24 as described above, and then enter the polarization beam splitter 25.

Figure 3:
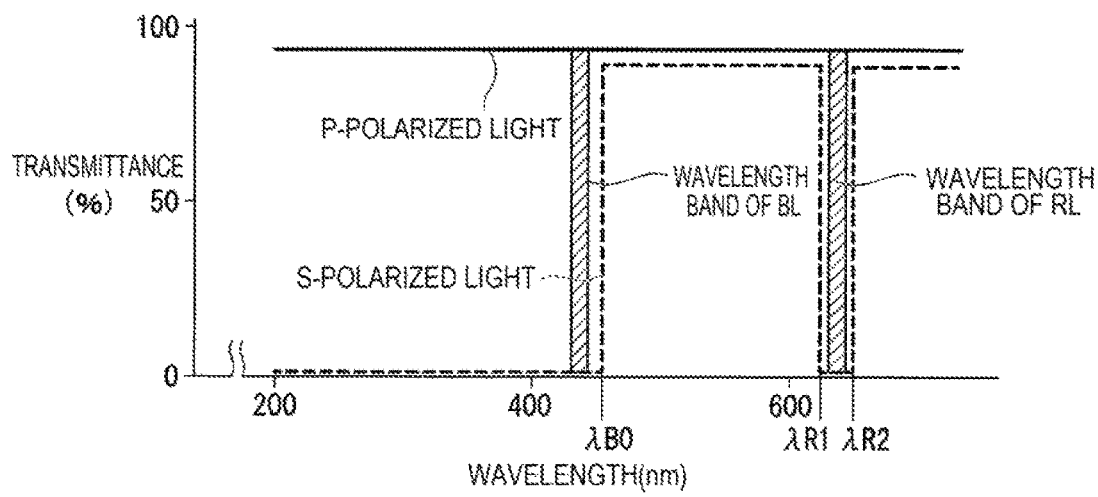
FIG. 3 is a diagram showing a spectral transmittance characteristic of a polarization beam splitter.

FIG. 3 is a diagram showing a spectral transmittance characteristic of the polarization beam splitter. In FIG. 3, the vertical axis represents the transmittance of the polarization beam splitter, and the horizontal axis represents the wavelength of the light entering the polarization beam splitter. Further, in FIG. 3, the transmittance characteristic in the P-polarized light is represented by the solid line, and the transmittance characteristic in the S-polarized light is represented by the dotted line. It should be noted that in FIG. 3, the wavelength $\lambda B0$ is a wavelength longer than the wavelength of the light beam BL and shorter than the shortest wavelength of the band of the fluorescence YL. Further, in FIG. 3, the wavelength $\lambda R1$ is equivalent to or slightly shorter than the shortest wavelength of the predetermined wavelength band of the red supplementary light beam RL, and the wavelength $\lambda R2$ is equivalent to or slightly longer than the longest wavelength of the predetermined wavelength band of the red supplementary light beam RL. In other words, it is desirable to make the band between the wavelength $\lambda R1$ and the wavelength $\lambda R2$ roughly coincide with the wavelength band (635 nm through 645 nm) of the red supplementary light beam RL.

Figure 4A:
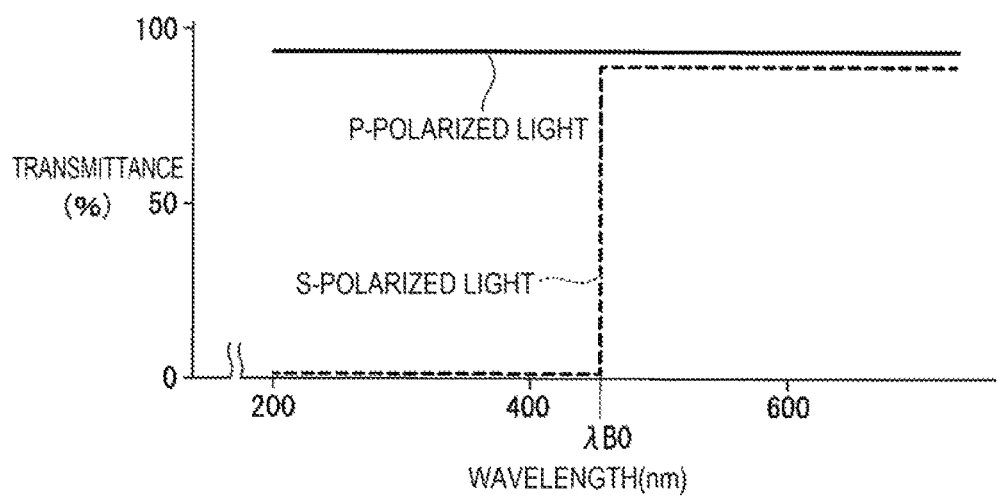
FIG. 4A is a diagram showing a filter constituting the polarization beam splitter.
Figure 4B:
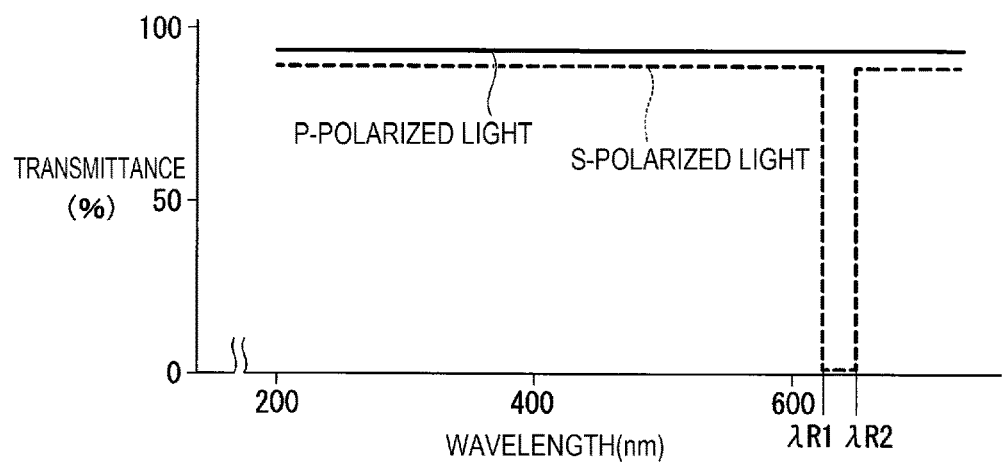
FIG. 4B is a diagram showing a filter constituting the polarization beam splitter.

As shown in FIG. 3, in the polarization beam splitter 25, the transmittance for the P-polarized light is as high as no lower than 90% throughout the entire visible range. In the polarization beam splitter 25, the transmittance for the S-polarized light is zero or roughly zero in the short wavelength band not longer than $\lambda B$, and the wavelength band between $\lambda R1$ and $\lambda R2$. Such a spectral transmittance characteristic can be realized by overlapping, for example, a filter having the characteristic shown in FIG. 4A and a filter having the characteristic shown in FIG. 4B with each other.

The polarization beam splitter 25 splits the light beams BL into the S-polarized light beams BLs (a blue second polarization component) with respect to the polarization beam splitter 25 and the P-polarized light beams BLp (a blue first polarization component). The P-polarized light beams BLp are transmitted through the polarization beam splitter 25, and then proceed toward the diffusely reflecting element 30, and the S-polarized light beams BLs are reflected by the polarization beam splitter, and then proceed toward the fluorescence emitting element 27.

Further, the polarization beam splitter 25 of the present embodiment has a polarization split characteristic of transmitting the P-polarized light and reflecting the S-polarized light in the wavelength band of the red supplementary light beams RL. Since the red supplementary light beams RL are each P-polarized light with respect to the polarization beam splitter 25, the red supplementary light beams RL are transmitted through the polarization beam splitter 25.

The red supplementary light beams RL proceed toward the diffusely reflecting element 30 together with the P-polarized light beams BLp transmitted through the polarization beam splitter 25. Specifically, the red supplementary light beams RL and the P-polarized light beams BLp having been transmitted through the polarization beam splitter 25 enter the first wave plate 28b.

The first wave plate 28b is formed of a quarter-wave plate disposed in the light path between the polarization beam splitter 25 and the diffusely reflecting element 30. Therefore, the P-polarized light beams BLp and the red supplementary light beams RL having been emitted from the polarization beam splitter 25 are converted by the first wave plate 28b into, for example, blue light beams BLc1 and red supplementary light beams RLc1 as clockwise circularly polarized light, and then enter the second light collection optical system 29. The second light collection optical system 29 is formed of, for example, a single lens. The blue light beams BLc1 and the red supplementary light beams RLc1 via the homogenizer optical system 23 and the second light collection optical system 29 enter the diffusely reflecting element 30 in the state in which the illumination distribution is homogenized.

The diffusely reflecting element 30 is disposed on the opposite side to the phosphor 34 in the polarization beam splitter 25, and diffusely reflects the blue light beams BLc1 and the red supplementary light beams RLc1, which have been emitted from the second light collection optical system 29, toward the polarization beam splitter 25. As the diffusely reflecting element 30, it is preferable to use an element which causes the Lambertian reflection of the incident light, and at the same time does not disturb the polarization state.

Hereinafter, the light reflected by the diffusely reflecting element 30 is referred to as blue light beams BLc2 and the red supplementary light beams RLc2. According to the present embodiment, by diffusely reflecting the blue light beams BLc1 and the red supplementary light beams RLc1, there can be obtained the blue light beams BLc2 and the red supplementary light beams RLc2 having a roughly homogenized illuminance distribution. For example, the blue light beams BLc1 and the red supplementary light beams RLc1 as the clockwise circularly polarized light are reflected as the blue light beams BLc2 and the red supplementary light beams RLc2 as counterclockwise circularly polarized light. The blue light beams BLc2 and the red supplementary light beams RLc2 are converted by the second light collection optical system 29 into parallel light, and then enter the first wave plate 28b once again.

Further, the light which has been diffusely reflected by the diffusely reflecting element 30 and then converted into the light in a different polarization state via the first wave plate 28b is referred to as blue diffused light beams BLs1 and red diffused light beams RLs1. According to the present embodiment, the blue light beams BLc2 and the red supplementary light beams RLc2 as the counterclockwise circularly polarized light are converted by the first wave plate 28b into the blue diffused light beams BLs1 and the red diffused light beams RLs1 as S-polarized light.

The blue diffused light beams BLs1 and the red diffused light beams RLs1 as the S-polarized light are reflected by the polarization beam splitter 25 toward the lens integrator 31.

In the present embodiment, the blue diffused light beams BLs1 and the red diffused light beams RLs1 are diffusely reflected by the same diffusely reflecting element 30, and therefore, become roughly the same in degree of diffusion. Therefore, the blue diffused light beams BLs1 and the red diffused light beams RLs1 each become approximated to the emission distribution of the fluorescence YL described later. Therefore, the illumination light WL described later obtained by combining the blue diffused light beams BLs1, the red diffused light beams RLs1 and the fluorescence YL with each other becomes difficult to cause color unevenness in the displayed image.

Meanwhile, the light beams BLs as the S-polarized light having been reflected by the polarization beam splitter 25 enter the first light collection optical system 26. In the present embodiment, the first light collection optical system 26 is constituted by, for example, a first lens 26a and a second lens 26b. The light beams BLs via the homogenizer optical system 23 and the first light collection optical system 26 enter the area to be illuminated of the fluorescence emitting element 27 in the state in which the illuminance distribution is homogenized. The fluorescence emitting element 27 has the phosphor 34, a substrate 35 for supporting the phosphor 34, and a fixation member 36 for fixing the phosphor 34 to the substrate 35.

In the present embodiment, the phosphor 34 is fixed to the substrate 35 with the fixation member 36 disposed between a side surface of the phosphor 34 and the substrate 35. The phosphor 34 has contact with the substrate 35 in a surface on an opposite side to the side which the light beams BLs enter.

The phosphor 34 absorbs the light beams BLs to be excited. The phosphor 34 excited by the light beams BLs emits the yellow fluorescence YL in the wavelength band of, for example, 500 through 700 nm.

On the opposite side of the phosphor 34 to the side which the light beams BLs enter (on the opposite side to the first light collection optical system 26), there is disposed a reflecting section 37. The reflection section 37 reflects a component proceeding toward the substrate 35 out of the fluorescence YL generated by the phosphor 34.

On a surface of the substrate 35 opposite to the surface for supporting the phosphor 34, there is disposed a heatsink 38. In the fluorescence emitting element 27, since heat radiation can be achieved through the heatsink 38, the heat deterioration of the phosphor 34 can be prevented.

A part of the fluorescence YL generated by the phosphor 34 is reflected by the reflecting section 37, and is then emitted to the outside of the phosphor 34. Further, another part of the fluorescence YL generated by the phosphor 34 is emitted to the outside of the phosphor 34 without the intervention of the reflecting section 37. In such a manner, the fluorescence YL is emitted from the phosphor 34 toward the first light collection optical system 26. The fluorescence YL is picked up by the first light collection optical system 26 to thereby be collimated, and then enters the polarization beam splitter 25.

The fluorescence YL includes green fluorescence KG and red fluorescence KR. As shown in FIG. 3, the wavelength band of the red fluorescence KR out of the fluorescence YL includes a peak wavelength band (635 nm through 645 nm) of the red supplementary light beams RL emitted from the red supplementary light source 40. As described above, the polarization beam splitter 25 has a polarization split function with respect to the red supplementary light beams RL. Therefore, the polarization beam splitter 25 exerts the polarization split function selectively on a first red fluorescence component KR1 corresponding to a predetermined wavelength band of the red supplementary light beams RL out of the red fluorescence KR. Here, the first red fluorescence component KR1 corresponding to the predetermined wavelength band corresponds to a component in the band between the wavelength $\lambda R1$ and the wavelength $\lambda R2$ shown in FIG. 3.

Specifically, the polarization beam splitter 25 of the present embodiment has the polarization split function of splitting the first red fluorescence component KR1 out of the red fluorescence KR into a red P-polarization component (a red polarization split component) KR1p as P-polarized light with respect to the polarization beam splitter 25, and a red S-polarization component KR1s as S-polarized light with respect to the polarization beam splitter 25.

The red P-polarization component KR1p is transmitted through the polarization beam splitter 25, and at the same time, the red S-polarization component KR1s is reflected by the polarization beam splitter 25 to thereby be separated from the red P-polarization component KR1p. The red S-polarization component KR1s having been reflected by the polarization beam splitter 25 is reflected by the dichroic mirror 24, and is then blocked by a light blocking member not shown. Therefore, the red S-polarization component KR1s is not used as the illumination light WL described later.

In contrast, the polarization beam splitter 25 does not have the polarization split function with respect to a principal fluorescence component YL1 except the first red fluorescence component KR1 out of the fluorescence YL. Here, the principal fluorescence component YL1 includes red fluorescence KR2 except the first red fluorescence component KR1 out of the red fluorescence KR, and the green fluorescence KG. The principal fluorescence component YL1 is transmitted through the polarization beam splitter 25 to thereby proceed toward the lens integrator 31.

In the polarization beam splitter 25 of the present embodiment, a part (the red S-polarization component KR1s) of the fluorescence YL is not used as the illumination light WL. In other words, although the red S-polarization component KR1s becomes the light loss, the red S-polarization component KR1s is narrow in band, and has a minute proportion to the whole of the fluorescence YL, and therefore, it can be said that the light loss caused in the red component of the fluorescence YL is sufficiently small from the viewpoint of the whole of the light source device 2. It should be noted that the loss by the red S-polarization component KR1s can be compensated by the red supplementary light beams RL emitted from the red supplementary light source 40. Therefore, according to the light source device 2 of the present embodiment, the red component of the fluorescence YL can efficiently be used.

It should be noted that it is desirable for the band between the wavelength λR1 and the wavelength λR2 shown in FIG. 3 to completely coincide with the wavelength band of the red supplementary light beams RL. By achieving the above, the amount of the red S-polarization component KR1s which cannot be used as the illumination light can be kept to a minimum.

The polarization beam splitter 25 of the present embodiment emits the blue diffused light BLs1 and the red diffused light RLs1 diffusely reflected by the diffusely reflecting element 30, the red P-polarization component KR1p obtained by performing the polarization split on the first red fluorescence component KR1, and the principal fluorescence component YL1 (the red fluorescence KR2 and the green fluorescence KG) in one direction (a direction toward the lens integrator 31).

The polarization beam splitter 25 of the present embodiment combines the blue diffused light BLs1 and the red diffused light RLs1, the red P-polarization component KR1p and the principal fluorescence component YL1 with each other to generate the illumination light WL. The red diffused light RLs1 corresponds to the total flux (100%) of the red supplementary light beams RL emitted from the red supplementary light source 40.

The illumination light WL is emitted toward the lens integrator 31. The lens integrator 31 has a first multi-lens 31a and a second multi-lens 31b. The first multi-lens 31a has a plurality of first small lenses 31a m for dividing the illumination light WL into a plurality of partial light beams.

The lens surface (the surface of the first small lenses 31a m) of the first multi-lens 31a and the image formation area of each of the light modulation devices 4R, 4G and 4B are conjugated with each other. Therefore, the shape of each of the first small lenses 31a m is a roughly similar shape (a rectangular shape) to the shape of each of the image formation areas of the light modulation devices 4R, 4G and 4B. Thus, each of the partial light beams emitted from the first multi-lens 31a efficiently enters each of the image formation areas of the light modulation devices 4R, 4G and 4B.

The second multi-lens 31b has a plurality of second small lenses 31b m corresponding respectively to the first small lenses 31a m of the first multi-lens 31a. The second multi-lens 31b forms an image of each of the first small lenses 31a m of the first multi-lens 31a in the vicinity of each of the image formation areas of the respective light modulation devices 4R, 4G and 4B in cooperation with the superimposing lens 33.

The illumination light WL having been transmitted through the lens integrator 31 enters the polarization conversion element 32. The polarization conversion element 32 is constituted by polarization split films and wave plates (half-wave plates) arranged in an array. The polarization conversion element 32 converts the polarization direction of the illumination light WL into a predetermined direction. More specifically, the polarization conversion element 32 makes the polarization direction of the illumination light WL correspond to the direction of the transmission axis of the polarization plate (not shown) disposed on the light incident side of each of the light modulation devices 4R, 4G and 4B. Thus, the polarization direction of the red light LR, the green light LG and the blue light LB obtained by splitting the illumination light WL as described above corresponds to the transmission axis direction of the incident side polarization plate of each of the light modulation devices 4R, 4G and 4B. Therefore, the red light LR, the green light LG and the blue light LB are respectively guided to the image formation areas of the light modulation devices 4R, 4G and 4B in good condition without being blocked by the incident side polarization plates, respectively.

The illumination light WL having been transmitted through the polarization conversion element 32 enters the superimposing lens 33. The superimposing lens 33 homogenizes the illuminance distribution due to the illumination light WL in the area to be illuminated in cooperation with the lens integrator 31.

As described above, according to the light source device 2 of the present embodiment, by selectively transmitting the red supplementary light beams RL emitted from the red supplementary light source 40 using the polarization beam splitter 25, it is possible to generate the red light LR of the illumination light WL using 100% of the red supplementary light beams RL. Therefore, it is possible to generate the illumination light WL with the red light LR efficiently assisted.

Further, in the light source device 2 according to the present embodiment, it is possible to suppress the light loss (the red S-polarization component KR1s) generated in the polarization beam splitter 25 to a low level. Therefore, according to the light source device 2 of the present embodiment, the red component of the fluorescence YL can efficiently be used.

Further, in the light source device 2 according to the present embodiment, by adjusting the output of the red supplementary light beams RL emitted from the red supplementary light source 40, it is possible to arbitrarily control the assist amount of the red component (the red light LR) of the illumination light WL. Therefore, it is possible to efficiently generate the red light LR having a desired tint.

Further, in the light source device 2 according to the present embodiment, it is possible to diffusely reflect the light beams BL from the blue laser emitting elements 21a and the red supplementary light beams RL from the red laser emitting elements 40a with the common diffusely reflecting element 30. Therefore, compared to a configuration of respectively providing diffusely reflecting elements, it is possible to achieve reduction in size and reduction in cost of the light source device 2.

Further, the blue diffused light beams BLs1 and the red diffused light beams RLs1 are diffused by the common diffusely reflecting element 30, and are therefore homogenized in degree of diffusion. Therefore, in the case of combining the blue diffused light BLs1 and the red diffused light RLs1 with each other, it is possible to make it difficult to cause the color unevenness. Therefore, the illumination light WL including the blue diffused light BLs1 and the red diffused light RLs1 is reduced in color unevenness.

Further, according to the light source device 2 of the present embodiment, by rotating the second wave plate 28a, it is possible to change the ratio between the S-polarized light (the light beams BLs) and the P-polarized light (the light beams BLp) to thereby adjust the ratio between the fluorescence YL and the blue diffused light BLs1. Therefore, the color balance (the white balance) of the illumination light WL can be adjusted to a desired value.

Further, according to the light source device 2 of the present embodiment, since the light beams BLp as the P-polarized light and the red supplementary light beams RL on which the polarization split is performed by the polarization beam splitter 25, and which proceed toward the diffusely reflecting element 30 are made the same in polarization direction, it is possible to guide the red supplementary light beams RL to the diffusely reflecting element 30 without using a wave plate and so on.

Further, according to the projector 1 of the present embodiment, since the light source device 2 is provided, the light use efficiency is high, and by assisting the red light LR in good condition, it is possible to display an image bright and good in quality.

It should be noted that the present disclosure is not limited to the contents of the embodiment described above, but can arbitrarily be modified within the scope or the spirit of the present disclosure.

For example, in the embodiment described above, it is also possible to reverse the positions of the diffusely reflecting element 30 and the phosphor 34 with respect to the polarization beam splitter 25. Specifically, it is possible to adopt a configuration in which the light beams BLs (the second component of the blue laser beam) as S-polarized light reflected by the polarization beam splitter 25 are made to enter the diffusely reflecting element 30, and the light beams BLp (the first component of the blue laser beam) as P-polarized light transmitted through the polarization beam splitter 25 are made to enter the phosphor 34 as the excitation light.

Further, in the embodiment described above, it is also possible to dispose a homogenizer optical system between the red supplementary light source 40 and the dichroic mirror 24. According to this configuration, it is possible to improve the homogeneity of the illuminance distribution of the red supplementary light beams RL on the diffusely reflecting element 30.

Further, although in the embodiment described above, there is described the example of installing the light source device according to the present disclosure in the projector, this is not a limitation. The light source device according to the present disclosure can also be applied to lighting equipment, a headlight of a vehicle, and so on.

What is claimed is:

1. A light source device comprising:
    a blue laser emitting element;
    a red laser emitting element configured to emit light in a predetermined wavelength band;
    a light combining element configured to combine light from the blue laser emitting element and the light from the red laser emitting element with each other;
    a diffusely reflecting element configured to diffuse and reflect apart of the light from the blue laser emitting element and the light from the red laser emitting element;
    a phosphor excited by a part of the light from the blue laser emitting element to emit fluorescence including red fluorescence and green fluorescence;
    a polarization splitting/combining element disposed in a posterior stage of the light combining element, and having a polarization split function with respect to a first red fluorescence component corresponding to the predetermined wavelength band out of the red fluorescence, the light from the red laser emitting element, and the light from the blue laser emitting element; and
    a first wave plate disposed between the polarization splitting/combining element and the diffusely reflecting element, wherein
    the polarization splitting/combining element
        guides a blue first polarization component obtained by performing polarization split on the light from the blue laser emitting element, and the light from the red laser emitting element to the diffusely reflecting element, and guides a blue second polarization component obtained by performing polarization split on the light from the blue laser emitting element to the phosphor,
        emits, in one direction,
            red diffused light obtained by converting the light from the red laser emitting element via the diffusely reflecting element and the first wave plate into a different polarization state,
            blue diffused light obtained by converting the blue first polarization component via the diffusely reflecting element and the first wave plate into a different polarization state,
            a red polarization split component obtained by performing polarization split on the first red fluorescence component, and
            a principal fluorescence component obtained by removing the first red fluorescence component from the fluorescence,
        to combine the red diffused light, the blue diffused light, the red polarization split component, and the principal fluorescence component with each other to generate illumination light.

2. The light source device according to claim 1, further comprising:
    a second wave plate rotatably disposed between the blue laser emitting element and the light combining element, wherein
    the light emitted from the blue laser emitting element enters the light combining element via the second wave plate.

3. The light source device according to claim 1, wherein the light in the predetermined wavelength band emitted by the red laser emitting element is same in polarization direction as the blue first polarization component.

4. The light source device according to claim 2, wherein the light in the predetermined wavelength band emitted by the red laser emitting element is same in polarization direction as the blue first polarization component.

5. A projector comprising:

the light source device according to claim 1;

a light modulation device configured to modulate light from the light source device in accordance with image information to thereby form image light; and a projection optical system configured to project the image light.

6. A projector comprising:

the light source device according to claim 2;

a light modulation device configured to modulate light from the light source device in accordance with image information to thereby form image light; and a projection optical system configured to project the image light.

7. A projector comprising:

the light source device according to claim 3;

a light modulation device configured to modulate light from the light source device in accordance with image information to thereby form image light; and a projection optical system configured to project the image light.

8. A projector comprising:

the light source device according to claim 4;

a light modulation device configured to modulate light from the light source device in accordance with image information to thereby form image light; and a projection optical system configured to project the image light.

* * * * *